United States Patent [19]

Gmeiner et al.

[11] 4,454,390
[45] Jun. 12, 1984

[54] SWITCHING DEVICE FOR CONTROLLING SERVO DRIVE MECHANISMS OF VEHICLE SEAT

[75] Inventors: Günter Gmeiner; Rolf Krügener, both of Sindelfingen, Fed. Rep. of Germany

[73] Assignee: Daimler-Benz Aktiengesellschaft, Stuttgart, Fed. Rep. of Germany

[21] Appl. No.: 56,236

[22] Filed: Jul. 10, 1979

[30] Foreign Application Priority Data

Aug. 17, 1978 [DE] Fed. Rep. of Germany ....... 2836004

[51] Int. Cl.³ .......................................... H01H 25/00
[52] U.S. Cl. ................................... 200/6 A; 200/6 R
[58] Field of Search .................. 200/6 A, 6 R, 153 K; 318/561, 568, 666; 297/330

[56] References Cited

U.S. PATENT DOCUMENTS

| 2,756,290 | 7/1956 | Lybrook | 200/6 A |
| 2,827,105 | 3/1958 | Brundage | 297/330 X |
| 3,033,946 | 5/1962 | Meyer et al. | 200/6 A |
| 3,193,628 | 7/1965 | Wanlass | 200/6 A |
| 3,254,163 | 5/1966 | Wanlass | 200/6 A |
| 3,288,947 | 11/1966 | Wanlass et al. | 200/6 R |
| 3,371,166 | 2/1968 | Wolfe | 200/6 A |
| 3,483,337 | 12/1969 | Johnstone et al. | 200/6 A |
| 3,927,285 | 12/1975 | Frost et al. | 200/6 A |
| 4,128,797 | 12/1978 | Murata | 297/330 |

Primary Examiner—J. R. Scott
Attorney, Agent, or Firm—Craig & Burns

[57] ABSTRACT

A switching device for controlling servo drive mechanisms of vehicle seats, especially the seatback and/or seat cushion of automobiles. For each seat part to be adjusted there is provided a separate switching lever with a configuration arrangement at least essentially symbolic of the seat part to be adjusted by the respective lever. The respective switching levers are movably arranged in directions analogous to the intended adjusting directions of the seat part to be adjusted.

22 Claims, 1 Drawing Figure

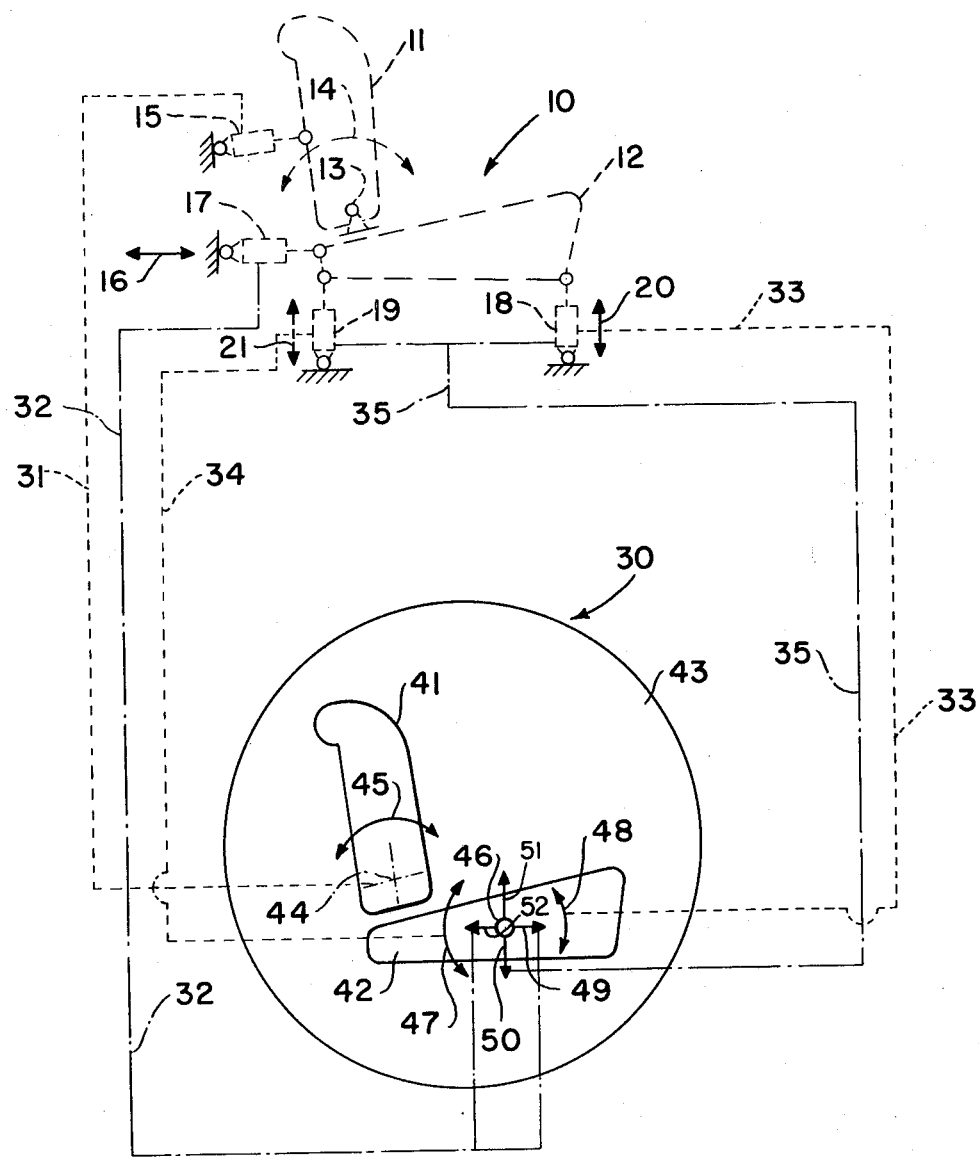

SWITCHING DEVICE FOR CONTROLLING SERVO DRIVE MECHANISMS OF VEHICLE SEAT

The present invention relates to a switching arrangement and, more particularly, to a switching device for controlling the servo drive mechanisms of vehicle seats, especially servo mechanisms associated with a seat back and/or seat cushion of a motor vehicle.

In a servo-actuated adjustment installation of vehicle seats by electric, hydraulic, or pneumatic methods, the seat adjustment apparatus includes a total of four servo drive mechanisms. More particularly, a servo drive mechanism is provided for pivoting the seatback so as to adjust the inclination of the seatback with a further servo drive mechanism being provided for the longitudinal displacement of the seat cushion in the forward or rearward direction of the vehicle. Yet another servo drive mechanism is provided for adjusting the height of the seat cushion in, for example, the zone of the front edge of the cushion with the fourth servo drive mechanism being provided for adjusting the height of the seat cushion in a zone of the rear edge. If the servo drive mechanism for the height adjustment in the zone of the front edge and rear edge of the seat cushion are switched on simultaneously and in the same direction, a vertical displacement of the seat cushion is effected in an upward or downward direction. In contrast thereto, if the two servo drive mechanisms are switched on simultaneously but in opposite directions of their servo functions, then the seat cushion is changed in the inclination of the seat cushion plane and is adjusted, for example, to be steeper or flatter.

The corresponding control of the servo drive mechanisms is effected by way of switches which are constructed in accordance with the type of servo drive mechanisms being used, that is, either an electrical, hydraulic, or possibly pneumatic switch construction.

Conventional switches are provided with operating elements in the form of a normal flip member which, for example, is adapted to be flipped in the on or off switching position. However, it is hard if not impossible for the user to recognize which switch operation will ensure the respective desired adjustment of the vehicle system.

The aim underlying the present invention essentially resides in providing a switching device for controlling the servo drive mechanisms in vehicle seats, especially the seatback and/or seat cushion of an automobile by which it is possible for the user to initiate and set the desired adjusting motion by purposely operating the switching device in an analogous fashion.

In accordance with advantageous features of the present invention, for each seat part to be adjusted, especially the seatback and the seat cushion, a separate switching lever is provided which is configured and arranged at least essentially symbolicly for the seat part to be respectively adjusted with the respective switching lever being movably arranged in the directions analogous to the intended adjusting directions of the seat part to be adjusted.

With a switching lever having a symbolic configuration of the seat part to be adjusted, in accordance with the present invention, the switching lever to be operated to initiate the adjustment of the seatback has the symbolic shape of the seatback with the other switching lever to be operated to initiate the seat cushion adjustment having the symbolic configuration of the seat cushion.

Advantageously, in accordance with further features of the present invention, both switching levers are qrranged in alignment which, in analogy to the angular alignment of the seatback and seat cushion, is likewise mutually angular. By the movable mounting of the respective switching levers so that they can be moved in a direction analogous to the actual occurring adjustment direction of the seat part, it is easier for the user to initiate the respectively desired seat part adjustment by operating the appropriate switching device.

For example, if the seatback is to be adjusted with respect to its inclination, the user need merely place the switching lever having the symbolic shape of the seatback into the position corresponding to the desired back inclination. However, if an adjustment of the seat cushion is desired such as, for example, a longitudinal adjustment in the forward or rearward direction, then it is merely necessary to shift the switching lever having the symbolic configuration of the seat cushion correspondingly in a forward or rearward direction. In the same manner, a pivotal operation of the switching lever leads to an analogous adjustment of the seat cushion inclination. If the height of the seat cushion is to be reduced or increased this is accomplished in accordance with the present invention by an analogous displacement of the switching lever having the symbolic shape of the seat cushion.

Advantageously, in accordance with the present invention, the switching lever associated with the seatback adjustment is mounted so as to be pivotable about a pivot axis which is analogous to the pivot axis or pivot axle of the seatback. The other switching lever for the seat cushion adjustment is mounted so as to be pivotable about a pivot axis which is analogous to the seat cushion adjusting axis which is approximately parallel to the plane of the seat cushion.

Additionally, in accordance with the present invention, the other switching lever for the seat cushion adjustment is furthermore mounted to be displaceable in a direction of a longitudinal axis and in a direction of a vertical axis essentially at a right angle thereto which is analogous to the longitudinal displacement direction of the cushion as well as analogous to the vertical displacement direction of the seat cushion.

In order to obtain a special simplification of the bearing for the switching lever associated with the seat cushion adjustment, the longitudinal axis and vertical axis of the other switching lever intersect each other with the pivot axis of this lever extending through the point of intersection of the axes. Preferably, the point of intersection is approximately at the longitudinal and vertical center of the other switching lever.

Advantageously, the pivot axis of one switching lever for the seatback adjustment is arranged in an end zone of the switching lever analogous to the lower seatback end.

In accordance with a still further feature of the present invention, the pivot axis of one switching lever for the seatback adjustment as well as this switching lever proper are arranged at a spacing from the other switching lever and outside of the range of motion of the other switching lever. By this arrangement, the switching lever intended for the seatback adjustment does not participate in the motion when the other switching lever intended for seat cushion adjustment is operated thereby resulting in an extremely simple construction for the switching device.

However, it is also possible in accordance with the present invention to provide a switching device wherein one switching lever for the seatback adjustment is arranged at the other switching lever for the seat cushion adjustment and is movable, together with the other switching lever during switching motions or operation of the other switching lever, but is separately pivotable about its pivot axis relatively to the switching lever for the seatback adjustment. In this case, the switching lever intended for the seatback adjustment participates in a motion of the switching lever operated for a seat cushion adjustment. However, even in this construction, the switching lever intended for a seatback adjustment is pivotably movable separately about its pivot axis to adjust the inclination of the seatback.

In accordance with additional features of the present invention, the switching levers may be arranged on a supporting plate which may be constructed as a switch base plate. Additionally, the switching plate may be constructed as a mounting for the switches or switching contacts arranged on the supporting plate.

As can be appreciated, the construction of the switches and/or the switching contacts is dependent upon the type of servo drive mechanisms which are employed for adjusting the vehicle seat. For example, if electrical servo drive mechanisms are provided, then the switches and/or switching contacts are likewise of an electrical type. However, if instead hydraulic or other pressure medium operated servo drive mechanisms are utilized, then the switches and/or switching contacts are correspondingly adapted.

In accordance with the present invention, each switching lever may be biased in each of its adjusting directions by means of resetting members such as, for example, resetting springs and, upon a deactivation of the adjusting force, the respective switching levers are reset, especially in a spring-elastic fashion, into its normal or starting position.

By virtue of such a construction, each adjusting step at the switching lever is operated against the action of a resetting member. The effect of the resetting members is that, after a releasing of the respective switching lever, the switching lever and thus the acted upon switch and/or its switching contacts are then reset to the starting position. Accordingly, an analogous adjusting motion takes place as long as the adjusting action is exerted on the switching lever and the associated switch remains in operation.

The switches associated with the switching levers of the present invention may be fashioned as relays operative for a duration of the effective adjusting force at the respective switching lever with the relays dropping off once the adjusting force is eliminated.

Advantageously, the switches associated with the switching levers may be fashioned as position follow-up switches and the supporting plate and respective switching lever may have mutually associated position markings, especially position graduation, for example, on the supporting plate and a correlated marking on the respective switching lever.

By providing a position follow-up switch construction the objective is attained that, for example, if the seatback is to be adjusted in its inclination and brought into a different position, the associated switching lever having the corresponding symbolic shape is pivoted so that this lever itself indicates the desired inclination.

Thereby, the associated switch is turned on even after the aforementioned switching lever has been released this switch remains in operation until the seatback has indeed attained the desired angle of inclination. Upon attaining the desired angle of inclination, the switch thereafter becomes nonconductive. Moreover, the aforementioned switching lever does not return into its starting position but rather remains in the pivoted position corresponding to that of the seatback.

By virtue of the provision of the position graduations in accordance with the present invention, the objective is attained that the extent of adjustment of the respective seat part can be recognized right from the switching device so that exactly defined seat part positions can be set at the switching device. In this connection, the switching lever to be operated in a particular case need not be operated and moved until the seat part to be adjusted has assumed the desired position. Rather, the position is predetermined by the respective switching lever. The associated position follow-up switch remains in operation until the seat part to be adjusted has followed suit.

Accordingly, it is an object of the present invention to provide a switching device for controlling the servo drive mechanisms of vehicle seats which avoids, by simple means, shortcomings and disadvantages encountered in the prior art.

Another object of the present invention resides in providing a switching device for controlling the servo drive mechanisms of vehicle seats by which the user is able to quickly recognize which switch operation ensures the desired adjustment of the vehicle seat.

A further object of the present invention resides in providing a switching device for controlling the servo drive mechanisms of vehicle seats wherein the specific switching lever to be operated can be readily identified by the symbolic shape thereof which corresponds to the specific seat part to be operated by the switching lever.

A still further object of the present invention resides in providing a switching device for controlling the servo drive mechanisms of vehicle seats which is simple in construction and therefore relatively inexpensive to manufacture.

Another object of the present invention resides in providing a switching device for controlling the servo drive mechanisms of vehicle seats which functions reliably during all adjusting movements of the respective seat parts.

These and other objects, features, and advantages of the present invention will become more apparent from the following description when taken in connection with the accompanying drawing which shows, for the purposes of illustration only, one embodiment in accordance with the present invention, and wherein:

The single FIGURE of the drawing is a partially schematic side view of a seat for a motor vehicle including the switching device for operating the servo drive mechanisms in accordance with the present invention as well as schematic lines of operation of the vehicle seat.

Referring now to the drawing, a vehicle seat generally designated by the reference numeral 10, illustrated in phantom lines and on a substantially reduced scale, is provided with a seatback 11 and a seat cushion 12. The seatback 11 is pivotable about a back pivot axis or axle 13 in a direction of the arrow 14 by an adjusting movement so as to set the inclination of the seat back 11. For a servo-actuated adjustment of the seatback 11, a servo drive mechanism 15, constructed in a conventional manner, is adapted to engage the seatback 11.

To displace the seat cushion 12 in the longitudinal direction designated by the double-headed arrow 16, an associated servo drive mechanism 17 engages the seat cushion 12. Additionally, a servo drive mechanism 18 engages the seat cushion 12 in a forward zone, namely, at the lower forward end and a servo drive mechanism 19 engages the lower rearward zone of the seat cushion 12.

For the sake of clarity, the servo drive mechanisms 15, 16, 17, 18, and 19 are merely illustrated as servo cylinders. However, in a preferred embodiment, the servo drive mechanisms 15, 17–19 are each constructed as an electrical servo drive means such as, for example, an electric servo motor. As can readily be appreciated, all of the servo drive mechanisms 15, 17–19 can also be constructed, as illustrated, in the form of pressure medium operated servo cylinders such as, for example, hydraulic cylinders.

An adjusting operation of the servo drive mechanism 18 is effective in the vertical direction designated by the double-headed arrow 20 with an adjusting motion of the servo drive mechanism 19 acting in the vertical direction indicated by the double-headed arrow 21.

If the servo drive mechanism 15 is turned on in one adjustment direction, this results in a pivotal movement of the seatback 11 in the direction of the arrow 14 about the back pivot axis or axle 13.

If two servo drive mechanisms 18, 19 of the seat cushion 12 are simultaneously turned on and in the same direction, for example, in the vertical or upward direction designated by the arrows 20, 21, then the seat cushion 12 is lifted thereby. However, if the two servo drive mechanisms 18 and 19 operate, instead of in an upward direction, simultaneously and unidirectionally in the direction of the arrow 20 or 21 downwardly, then the seat cushion 12 is lowered. If only the servo drive mechanism 18 is switched on then the seat cushion 12 moves with its front edge in the upward or downward direction depending on the direction the servo drive mechanism 18 is operated. Both of these motions take place approximately in the direction of the arrow 20 with a minor pivotal movement. At the same time, the other servo drive mechanism 19 can be turned on, for example, in a direction opposite to that of the servo drive mechanism 18. Such an operation of the servo drive mechanism 19 would lead, depending upon the operating direction, to an adjustment of the height of the front edge of the seat cushion. In a reversed but otherwise identical fashion, the seat cushion 12 can also be adjusted with respect to the height of its rear edge.

A switching device generally designated by the reference numeral 30 is disposed in an interior of the vehicle (not shown). In its actual construction, as compared to the size of the vehicle seat 10, the switching device 30 would be considerably smaller. The switching device 30 includes a number of switches, not shown in the drawing, which, depending on the type of servo drive mechanisms 15, 17–19, are electrical switches or are adapted to control a pressure medium. The switches are respectively associated with the servo drive mechanisms 15, 17–19 for controlling the operation thereof which is shown by merely schematically indicated lines of operation.

Thus, a switch is provided for controlling the operation of the servo drive mechanism 15 with the switch controlling the servo drive mechanism by way of the dotted operating line 31.

In a corresponding manner, the servo drive mechanism 17 is controlled by way of a dot-dash line of operation 32, the servo drive mechanism 18 by way of the dotted line of operation 33, the servo drive mechanism 19 by way of the dotted line of operation 34 and the two servo drive mechanisms 18 and 19 are simultaneously controlled either in the same direction or in opposite directions by way of the dot-dash line of operation 35.

The switching device further includes a respectively coordinated individual switching lever 41, 42 for the seatback 11 as well as the seat cushion 12. As shown in the drawings, the switching lever 41 is configured so that it corresponds symbolically to the shape of the seatback 11 and, in a corresponding fashion, the switching lever 42 has a configuration so that it corresponds symbolically to that of the seat cushion 12. Also, the two switching levers 41, 42 are analogously selected to correspond to that of the seatback 11 and seat cushion 12. Just as the seatback 11 is aligned approximately angularly to the seat cushion 12 so the symbolic switching lever 41 is also angularly aligned with respect to the symbolic switching lever 42.

Moreover, the respective switching levers 41 or 42 are mounted so as to be movable in directions analogous to the adjusting directions of the seat part to be respectively adjusted, that is, the seatback 11 or seat cushion 12. Both switching levers 41 and 42 are arranged on a supporting plate 43 constructed as a switch base plate and having, in the illustrated embodiment, a circular configuration. The supporting plate 43 simultaneously serves as the mounting means for the switches or switching contacts associated with each lever 41 and 42 in a manner not illustrated in detail in the drawings.

The switching lever 41 for adjusting the seatback 11 is supported on the supporting plate 43 so as to be pivotably movable about a pivot axis 44 in the direction of the arrow 45, that is, the mounting and movability of a switching lever 41 is analogous to the mounting and movability of the seatback 11 about the rear pivot axle 13 in the direction of the arrow 14.

The other switching lever 42, serving for adjusting the seat cushion 12, is supported so as to be pivotably movable about a pivot axle 46 in the direction of the arrows 47, 48. This pivotal motion about the pivot axle 46 in the direction of the arrows 47, 48 is analogous to the pivotal motion of the seat cushion 12 with a concomitant adjustment of the height of either the front edge or the rear edge of the seat cushion 12. Consequently, the pivot axle 46 is analogous to the cushion adjusting axis which is disposed approximately in parallel to the plane of the seat cushion 12 which cushion adjusting axis lies in the seat cushion 12 either on the bottom, righthand side, lefthand side, or some other location of the seat cushion 12.

The switching lever 42 is mounted so as to be relatively displaceable in the directions designated by the arrows 49, 50, 51, 52. The directions designated 49, 52 extend along a longitudinal axis with the directions 50, 52 extending along a vertical axis which is essentially at right angles to the longitudinal axis. The displaceability of the switching lever 42 in the directions of the arrows 49, 52 is analogous to the longitudinal displacement of the seat cushion 12 in the direction indicated by the double-headed arrow 16. The displaceability of the switching lever 42 in the direction of the arrows 50, 52 is analogous to the vertical displacement of the seat cushion 12 in the direction of the double-headed arrows 20, 21.

As shown in the drawings, the longitudinal axis, that is the directions designated 49, 52, and the vertical axis, that is, the directions designated by the arrows 50, 51, intersect each other and, at the point of intersection a pivot axle 46 extends therethrough so as to enable the switching lever 42 to have a pivotal movement in the direction of the arrows 47, 48. In the illustrated embodiment, the point of intersection is located approximately at the longitudinal and vertical center of the switching lever 42; however, as can be appreciated, the point of intersection may be disposed at other locations relative to the switching lever 42.

The pivot axis 44 of the switching lever 41 for adjusting the seatback 11 is arranged at a bottom end zone of the switching lever 41 and is thus likewise analogous to the back pivot axle 13 of the seat back 11. In this connection, the pivot axis 44 of the switching lever 41, as well as the switching lever 41 proper, are located at a distance spaced from and above the switching lever 42 so as to be outside the range of motion of the switching lever 42. In case of a movement of the switching lever 42 in any direction designated by the arrows 47-52 the switching lever 41 remains stationery and does not participate in such motion. However, it is also possible, in a manner not illustrated in detail in the drawings, to arrange the switching lever 41 with respect to the other switching lever 42 so that the switching lever 41 would be moved together with the switching lever 42 during a switching displacement of the lever 42 in the direction of the arrows 47-52. Additionally, in such construction, the switching lever 41 would still be separately pivotable with respect to the switching lever 42 separately about its own pivot axis 44 so as to enable an adjusting of the seatback 11 by a displacement of the switching lever 41.

Each switching lever 41, 42 may be under the effect of resetting springs (not shown in the drawings) for the sake of clarity, in each of its adjustment directions indicated by the arrow 45 or one of the arrows 47-50. By means of these resetting springs each switching lever 41, 42 can be spring-elastically reset into its starting position once the adjusting force is removed from the switching lever. In this case, the switches associated with the switching levers 41, 42 are constructed as relays which are operative for the duration of the effective adjusting force of the respective switching lever 41, 42 which relays drop off when the adjusting force is removed. Assuming such a construction, the switching device of the present invention operates as follows:

If the inclination of the seatback 11 is to be adjusted, the user pivots the switching lever 41 about the pivot axis 44 in the direction of the arrow 45 so as to lead to an activation of the switch associated with the switching lever 41 and thus to a corresponding control of the servo drive mechanism 15 by way of the line of operation 31. The switching lever 41 must be held in the position of the pivoting direction of the arrow 45 until the servo drive mechanism 15 has adjusted the seat back to the desired inclination, as may be detected by body contact with the seatback. Thereafter, the switching lever 41 is released.

If the seat cushion 12 is to be shifted in the longitudinal direction designated by the arrow 16, for example, toward the right of the drawing, then the switching lever 42 is shifted toward the right in the direction of the arrow 49 so that the switch associated with the switching lever 42 is activated leading to an analogous actuation of the servo drive mechanism 17 by way of the line of operation 32. Once the seat cushion 12 has reached the desired position in the longitudinal displacement direction of the arrow 16, the switching lever 42 can then be released.

If the seat cushion 12 is to be, for example, lifted in the direction of the arrow 20,21, the switching lever 42 is shifted for this purpose in the direction of the arrow 51, namely, in the upward direction. The switch associated therewith acts on both servo drive mechanisms 18 and 19 simultaneously and in the same direction by way of the line of operation 35 thereby causing an analogous adjustment of the seat cushion 12 in the vertical direction. Once the desired height has been reached, the switching lever 42 can be released.

A displacement of the switching lever 42 in the direction of the arrow 50 results, by way of the line of operation 35, in the simultaneous and unidirectional actuation of the servo drive mechanisms 18,19 in the direction of the arrows 20, 21, in the downward direction whereby the seat cushion is lowered. Likewise, a displacement of the seat lever 42 in the direction of the arrow 52 results, by way of the line of operation 32, in the servo mechanism 17 displacing the seat cushion 12 to the left of the drawing.

Upon release of the switching levers 41, 42 following the respective adjustments of the seat cushion 12 and seatback 11, the resetting springs act upon the switching levers 41, 42 so as to result in the respective levers 41, 42 being returned to their starting position in a spring-elastic fashion.

If the height of the front edge or the rear edge of the seat cushion 12 is to be varied, the switching lever 42 is pivoted about the pivot axle 46 in the direction of the arrow 47 or 48 so that, by way of the line of operation 33 or 34, a corresponding simultaneous but oppositely directed actuation of the servo drive mechanisms 18,19 is effected. A pivotal operation of the switching lever 42 in the direction of the arrow 48, in the clockwise direction, results in a lowering of the front edge of the seat cushion 12 while a pivotal operation in the direction of the arrow 47, in the counterclockwise direction, leads to a lifting of the front edge of the seat cushion 12.

The height of the rear edge of the seat cushion 12 is adjusted analogously by the pivotal operation of the switching lever 42 in the direction of the arrow 48 or 47, namely, when pivoting in the clockwise direction in the upward orientation and when pivoting in the counterclockwise direction in the downward direction.

The switches associated with the switching levers 41,42 may, in a manner not illustrated in detail in the drawings, be constructed as follow-up switches. This means that the switching levers 41 and/or 42 to be operated for the seat adjustment are adapted to be placed by the operator in a position corresponding to the desired seat position wherein the switching levers 41, 42 could thereafter be released and remain in the established position. The vehicle seat 10 would then be adjusted analogously until it has reached the position corresponding to the position of the switching lever 41 and/or 42.

By virtue of the utilization of follow-up switches, the operator can preset the desired adjusting position of the seatback 11 or the seat cushion 12 by an adjusting movement of the switching levers 41, 42 and can then release the switching lever and wait for the adjustment of the vehicle seat 10 to be effected by way of the servo drive mechanisms.

Advantageously, the supporting plate 43 and the respective switching lever 41, 42 may be provided with mutually associated position markings so that it is possible to provide a position graduation on the supporting plate 43 for each adjusting range of the switching lever 41 or 42 while the associated switching lever 41 or 42 has a corresponding marker. In such a case, the extent of adjustment of the vehicle seat 10 can be recognized at the switching device 30 and it is possible to set extremely accurately previously defined seat positions at the switching device 30.

While we have shown and described several embodiments in accordance with the present invention, it is understood that the same is not limited thereto but is susceptible of numerous changes and modifications as known to one having ordinary skill in the art, and we therefore do not wish to be limited to the details shown and described herein but intend to cover all such modifications as are encompassed by the scope of the appended claims.

We claim:

1. A switching device for controlling servo drive mechanisms for adjusting at least one seat part of an autombbile seat, characterized in that a separate switching lever means adapted to be operatively connected with the servo drive mechanisms is provided for each seat part to be adjusted, and in that means are provided for mounting the switching lever means so as to be displaceable in directions corresponding to intended adjusting directions of the seat part with which the switching lever means is associated.

2. A switching device according to claim 1, wherein at least two seat parts are to be adjusted, the two seat parts comprising a seatback and a seat cushion, characterized in that a first switching lever means is operatively associated with the seatback and a second switching lever means is operatively associated with the seat cushion, the first switching lever means has a configuration essentially symbolically corresponding to the seatback and the second switching lever means has a configuration essentially symbolically corresponding to the seat cushion, and in that the first and second switching lever means are arranged with respect to one another in the same relationship as the seatback and seat cushion of the automobile seat.

3. A switching device according to claim 2, characterized in that the mounting means for mounting the first switching lever means includes a pivot means for pivotally mounting said first switching lever means in a manner which is analogous to a pivot axle of the seatback of the automobile seat.

4. A switching device according to claim 2, characterized in that the mounting means for the second switching lever means includes a pivot means for pivotally mounting said second switching lever means in a manner which is analogous to an adjusting axis of the seat cushion which is approximately parallel to a plane of the seat cushion.

5. A switching device according to claim 3, characterized in that the mounting means for the second switching lever means further includes means for enabling a displacement of the second switching lever means along a longitudinal axis and along a vertical axis extending essentially at a right angle to the longitudinal axis, the longitudinal axis and vertical axis being analogous to a longitudinal and vertical displacement direction of the seat cushion.

6. A switching device according to claim 5, characterized in that a pivot means is disposed at and extends through a point of intersection of the longitudinal axis and the vertical axis.

7. A switching device according to claim 6, characterized in that the point of intersection is arranged approximately at a longitudinal and vertical center of the second switching lever means.

8. A switching device according to claim 7, characterized in that the mounting means for mounting the first switching lever means includes a further pivot means for pivotally mounting said first switching lever means in a manner which is analogous to a pivot axle of the seatback of the automobile seat, and in that said further pivot means is arranged in an end zone of the first switching lever means in a position analogous to a lower end of the seatback.

9. A switching device according to claim 8, characterized in that the pivot means of the first switching lever means as well as the first switching lever means are arranged at a predetermined distance from the second switching lever means outside a range of motion of the second lever means.

10. A switching device according to one of claims 3, 4, 5 or 8, characterized in that the first switching lever means is arranged at the second switching lever means so as to be movable therewith during switching motions of the second switch lever means but is separately pivotable about its pivot means relative to the second switching lever means for enabling a seatback adjustment.

11. A switching device according to claim 10, characterized in that both switching lever means are arranged in an angular alignment with respect to each other corresponding to an angular alignment of the seatback and the seat cushion with respect to each other.

12. A switching device according to claim 10, characterized in that a supporting plate means is provided for supporting the switching lever means.

13. A switching device according to claim 12, characterized in that the supporting plate means serves as a mounting means for mounting one of switches and switching contacts associated with the first and second switching lever means.

14. A switching device according to claim 13, characterized in that resetting means are provided for normally urging each of the switching lever means into a neutral position upon a removal of an adjusting force from the respective switching lever means.

15. A switching device according to claim 14, characterized in that said resetting means includes resetting springs for resetting the respective switching lever means to a neutral position in an elastic manner.

16. A switching device according to claim 14, characterized in that switches associated with the respective switching lever means are constructed as relay means operative for a duration of an application of an adjusting force at the respective switching lever means with the relay means becoming inoperative once the adjusting force is removed.

17. A switching device according to claim 14, characterized in that switches associated with the respective switching lever means are constructed as follow-up switches.

18. A switching device according to claim 17, characterized in that position graduations are provided at the supporting plate means and the respective switching lever means so as to enable identifiable predetermined settings of the switching lever means.

19. A switching device according to one of claims 1, 2, 3, or 4, characterized in that a supporting plate means is provided for supporting the switching lever means.

20. A switching device according to one of claims 1, 2, 3, or 4, characterized in that resetting means are provided for normally urging each of the switching lever means into a neutral position upon a removal of an adjusting force from the respective switching lever means.

21. A switching device according to one of claims 1, 2, 3, or 4, characterized in that switches associated with the respective switching lever means are constructed as relay means operative for a duration of an application of an adjusting force at the respective switching lever means with the relay means becoming inoperative once the adjusting force is removed.

22. A switching device according to one of claims 1, 2, 3, or 4, characterized in that switches associated with the respective switching lever means are constructed as follow-up switches.

* * * * *

REEXAMINATION CERTIFICATE (4139th)

United States Patent [19]
Gmeiner et al.

[11] B1 4,454,390
[45] Certificate Issued Aug. 29, 2000

[54] SWITCHING DEVICE FOR CONTROLLING SERVO DRIVE MECHANISMS OF VEHICLE SEAT

[75] Inventors: Günter Gmeiner; Rolf Krügener, both of Sindelfingen, Germany

[73] Assignee: Daimler-Benz Aktiengesellschaft, Stuttgart, Germany

Reexamination Request:
No. 90/004,985, May 6, 1998

Reexamination Certificate for:
Patent No.: 4,454,390
Issued: Jun. 12, 1984
Appl. No.: 06/056,236
Filed: Jul. 10, 1979

[30] Foreign Application Priority Data
Aug. 17, 1978 [DE] Germany .................. 2836004

[51] Int. Cl.⁷ .................................................. H01H 25/00
[52] U.S. Cl. ........................................... 200/6 A; 200/6 R
[58] Field of Search ................................... 200/5 R, 5 A, 200/6 R, 6 A; 318/560, 561, 568.1–568.25, 666; 297/330–344.26

[56] References Cited

U.S. PATENT DOCUMENTS 2,823,272   2/1958   Adams .................................. 200/6 A

FOREIGN PATENT DOCUMENTS 1 405 868   1/1969   Germany .
1 430 839   7/1970   Germany .

*Primary Examiner*—James R. Scott

[57] ABSTRACT

A switching device for controlling servo drive mechanisms of vehicle seats, especially the seatback and/or seat cushion of automobiles. For each seat part to be adjusted there is provided a separate switching lever with a configuration arrangement at least essentially symbolic of the seat part to be adjusted by the respective lever. The respective switching levers are movably arranged in directions analogous to the intended adjusting directions of the seat part to be adjusted.

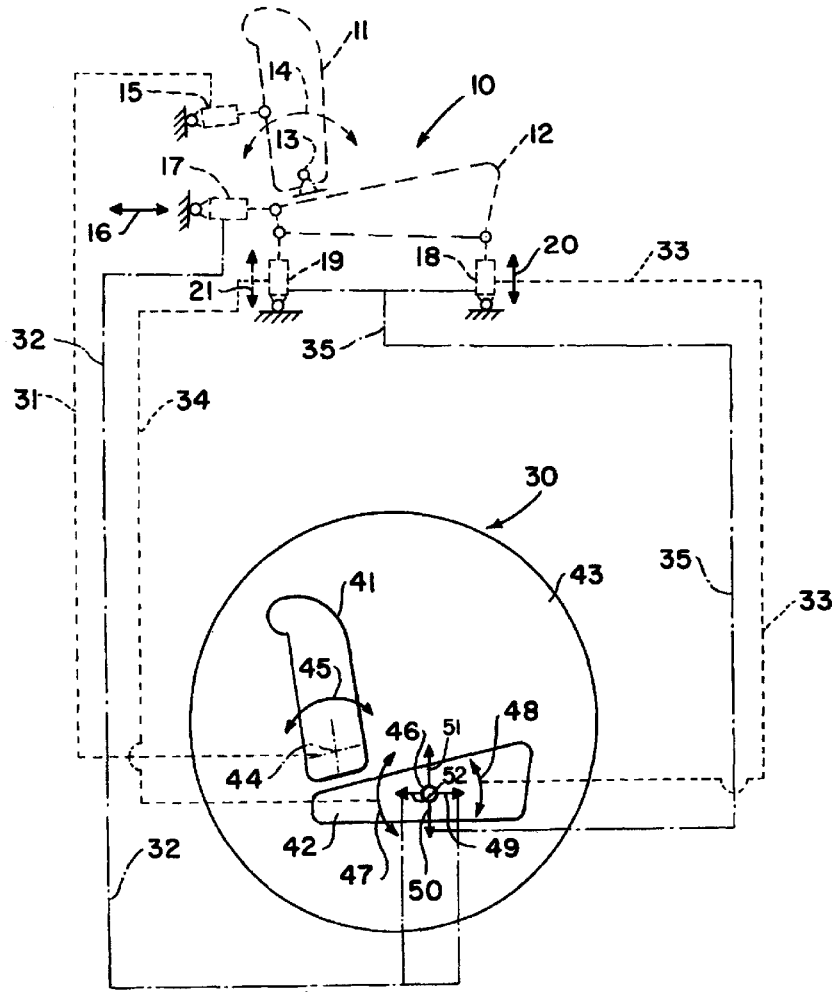

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2–22 is confirmed.

Claim 1 is cancelled.

New claims 23–30 are added and determined to be patentable.

*23. A switching device according to claim 1, wherein at least two seat parts are to be adjusted, the two seat parts comprising a seat back and a seat cushion, wherein a first switching lever is operatively associated with the seat back and a second switching lever is operatively associated with the seat cushion, said first and second switching levers being angularly aligned relative to one another analogously to the seat back and seat cushion of the automobile seat.*

*24. A switching device according to claim 23, wherein said switching levers have configurations essentially symbolically corresponding to a respective seat part.*

*25. The switching device according to claim 1, wherein at least two seat parts are to be adjusted, the two seat parts comprising a seat back and a seat cushion, wherein a first switching lever is operatively associated with the seat back and a second switching lever is operatively associated with the seat cushion; and*

*wherein longitudinal axes of the first and second switching levers intersect one another at an angle analogous to that formed by the seat back and seat cushion of the automobile seat.*

*26. A switching device according to claim 25, wherein said switching levers have configurations essentially symbolically corresponding to a respective seat part.*

*27. A switching device for controlling servo drive mechanisms for adjusting at least two seat parts of an automobile seat, characterized in that a separate switching lever means adapted to be operatively connected with the servo drive mechanisms is provided for said at least two seat parts to be adjusted, and in that means are provided for mounting the switching lever means so as to be displaceable in directions corresponding to intended adjusting directions of the seat part with which the switching lever means is associated.*

*28. A switching device according to claim 27, wherein said two seat parts comprise a seat back and a seat cushion.*

*29. A switching device according to claim 28, wherein a first of said separate switching lever means is operatively associated with the seat back and a second of said separate switching lever means is operatively associated with the seat cushion, said first and second switching lever means being arranged in an angular alignment analogous to that of the seat back and seat cushion of the automobile seat.*

*30. A switching device according to claim 29, wherein said first and second switching lever means are symbolically shaped to correspond with the respective seat part to be operated.*

\* \* \* \* \*